United States Patent Office 3,472,534
Patented Oct. 14, 1969

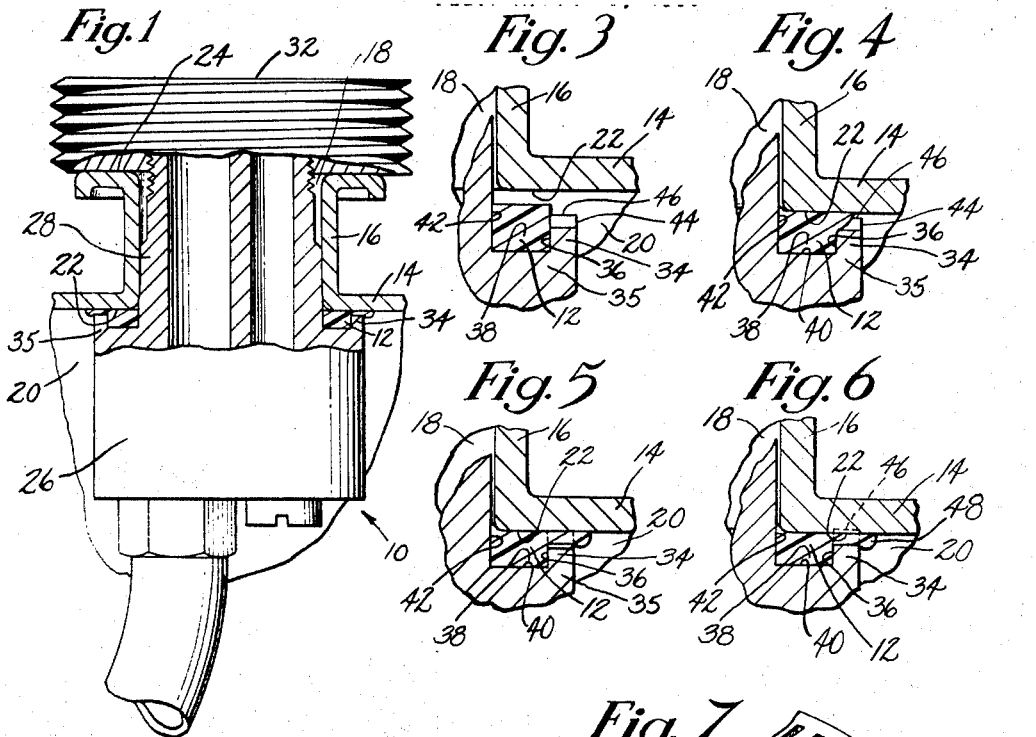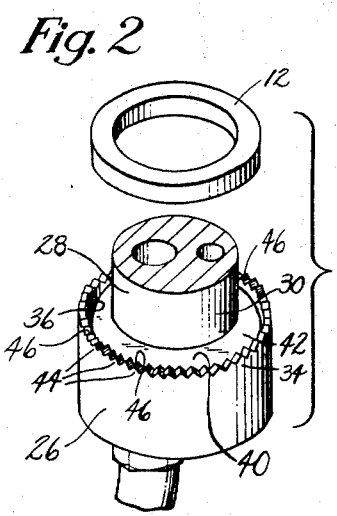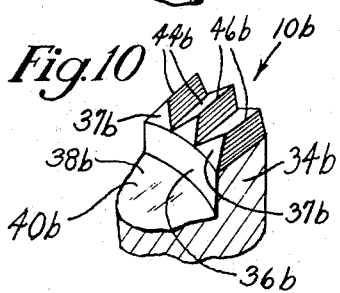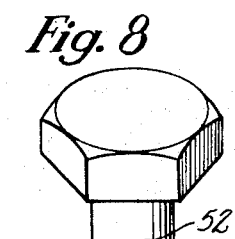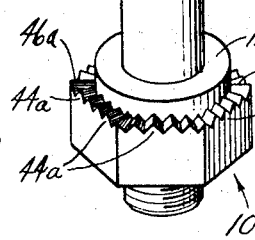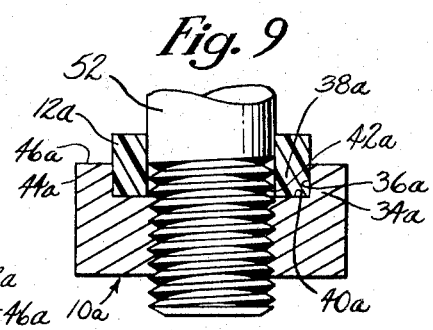

3,472,534
SEAL CONSTRUCTION
Frederick F. Stevens, Lanes Pond Road,
Northford, Conn. 06472
Filed Mar. 11, 1966, Ser. No. 533,619
Int. Cl. F16l 21/02, 19/02
U.S. Cl. 285—119     7 Claims

ABSTRACT OF THE DISCLOSURE

A device for sealing an opening in a member which has a suitable bearing surface surrounding the opening includes a part having a shoulder portion adapted to reside adjacent the bearing surface and including at least one sharp edge for incising the bearing surface. An elastomeric seal member received in a recess in the part has a volume sufficiently greater than the recess so that as the part is moved toward the bearing surface a portion of the seal member is extruded outwardly beyond the outer boundary of the part before the sharp edge cuts through the seal member and reaches the bearing surface. In one embodiment of the invention the part is generally cylindrical and has its maximum diameter adjacent the bearing surface and defined by a sharp annular edge. Other embodiments of the invention have teeth adjacent the outer boundary of the recess defining sharp edges for cutting through the seal member and incising the bearing surface.

---

This invention relates generally to sealing devices and deals more particularly with devices for sealing an opening in a member which includes a suitable bearing surface surrounding the opening, as for example, a barrel bung or the like.

In the description which follows the seal construction of this invention is shown as applied to a part of a keg tapping device generally similar to that shown in my U.S. Patent No. 3,228,413 issued Jan. 11, 1966 entitled "Keg Tapping Device and Method of Assembling of the Same with a Keg." It should be understood however that this has been done by way of example only and that, while the invention is particularly well suited for use with such a keg tapping device, there is no intention to limit the invention to this use and that in many instances it may be used to advantage with other types of closures.

The general object of this invention is to provide a device for sealing an opening in a member which includes a suitable bearing surface surrounding the opening.

Another object of the invention is to provide a sealing device employing an elastomeric seal wherein a novel means is provided to prevent excessive seal distortion to thereby prevent injury to the seal and increase its effective life.

A further object of the invention is to provide a device of the aforementioned U.S. patent and including a seal of uniform tightness on a member for a prolonged period.

A more particular object of the invention is to provide an effective sanitary bung seal for beverage kegs and the like.

Other objects of the invention will be apparent from the following description and from the drawing forming a part thereof.

The drawing shows preferred embodiments of the invention and such embodiments will be described, but the constructions disclosed, and the drawing and description are not to be construed as defining or limiting the scope of the invention, the claims forming a part of this specification being relied upon for that purpose.

Of the drawings:

FIG. 1 is an elevational view partially in section showing a keg unit of a keg tapping device assembled with a keg and utilizing a seal construction embodying this invention.

FIG. 2 is an exploded fragmentary perspective view showing the keg unit and seal of the embodiment of FIG. 1 prior to assembly.

FIG. 3 is a somewhat enlarged fragmentary view of the embodiment of FIG. 1 showing the base of the tapping device going into assembly with the keg.

FIG. 4 is generally similar to FIG. 3, except for showing a further stage of assembly.

FIG. 5 is generally similar to FIG. 3, except for showing a still further stage of the assembly.

FIG. 6 is similar to FIG. 3, except for showing the base in fully assembled relationship with the keg.

FIG. 7 is an enlarged fragmentary perspective view showing the seal as it appears after assembly.

FIG. 8 is a perspective view of another device embodying the invention.

FIG. 9 is a somewhat enlarged fragmentary vertical sectional view of the device of FIG. 8.

FIG. 10 is a somewhat enlarged fragmentary perspective view of a base of a tapping device showing a further embodiment of the invention.

Turning now to the drawing for a detailed description of the invention, and first referring to FIGS. 1 and 2, the invention in these figures is shown embodied in a keg unit 10 of a keg tapping device generally similar to that of the aforementioned U.S. patent and including a seal member 12, the unit 10 being shown attached to a keg 14 in FIG. 1 and separate from the keg in FIG. 2. The keg unit 10 is adapted to be secured in the tapping opening of the keg 14 or other container of the type conventionally used in storing and shipping beer or other liquids under pressure and is further adapted to receive an associated tavern unit (not shown) which is used to connect the keg with the dispensing equipment with which the keg is to be used. The seal member 12 is received by the keg unit 10 and engages the marginal portion of the keg surrounding the tapping opening to provide a liquid and gas-tight sanitary seal between the keg unit and the keg.

The keg 14 includes a forwardly projecting tubular and cylindrical wall 16 providing a generally cylindrical tapping bung or opening 18 communicating with the keg interior indicated at 20. The device of the present invention is particularly adapted for sealing an opening which has a suitable bearing or seating surface surrounding and generally normal to the axis thereof. The keg 14 includes such a surface which is shown at 22 and which faces rearwardly or toward the interior 20 of the keg to provide an engagement surface for the seal member 12. The forward or exterior end of the tubular wall 16 is flanged to form a forwardly facing seating surface 24.

The keg unit 10 may be made from various materials and may vary in shape, but preferably and as shown it is machined from metal and comprises an enlarged base portion 26 with a stem 28 arranged coaxial with the enlarged base portion and extending forwardly therefrom. The stem 28 includes a rear portion 30 which has a cross-sectional shape generally conforming with, but slightly smaller than the cross-sectional shape of the opening 18 to permit it to be inserted through the opening. The forward end of the stem 28 is externally threaded and projects forwardly beyond the seating surface 24 for receiving a retaining nut 32 which bears against the seating surface 24.

The base portion 26 is generally cylindrical and at its upper end has a shoulder portion 35 which includes a forwardly projecting annular wall 34 having a generally cylindrical radially inwardly facing surface 36 which serves to partially define an annular recess 38 for receiving the seal member 12. The bottom of the recess 38 is defined by a generally flat annular surface 40 spaced rearwardly from the forward end of the annular wall 34. Means further defining the recess 38 is provided by the rear stem portion 30 which has a forwardly facing surface 42 which is spaced radially from the wall 34 and which forms the inner wall of the said recess.

To restrain the unit 10 against rotational movement relative to the keg a series of generally circumaxially spaced forwardly projecting teeth 44, 44 are provided on the shoulder portion by its annular wall 34. Preferably, each of the teeth 44 are generally "V-shaped" and include a forwardly facing generally radially extending incising edge 46 adjacent the radially outer boundary of the recess 38. The incising edge on each tooth is adapted to cut or dig into the keg bearing surface 22 and for this reason the teeth are preferably harder than the material from which the bearing surface 22 is formed.

Cooperating with the unit 10 to provide a seal between the unit and the keg is the seal member 12 which is made from an elastomeric material and which is extruded radially outwardly from the stem 28 when the device is assembled with the keg. The shape of the seal member may vary, but preferably it closely conforms to the shape of the recess 38 within which it is received. In the assembled condition of the unit 10 and keg 14 the seal member engages the bearing surface 22. Prior to engagement with the bearing surface, however, the seal member 12 is in an undeformed condition and is located entirely within the axial projection of the radially inwardly facing surface 36 which forms the outer wall of the seal receiving recess 38. To cause the elastomeric seal material to extrude generally radially outwardly when the part 10 is moved toward the bearing surface 22, the seal member extends above and beyond the annular wall 34 and is greater than the volume of the recess 38 within which it is received.

Referring more particularly to FIGS. 3 through 6 which show progressive stages in the assembly of the unit 10 with the keg 14 it will be noted from FIG. 3 that, when in its undeformed condition, a portion of the seal member projects forwardly beyond the recess 38. The volume of the seal member is further sufficiently greater than the volume of the recess 38 so that as the unit 10 is moved forwardly toward the bearing surface 22 a portion of the seal member is extruded radially outwardly and beyond the outer boundary of the teeth 44, 44 shown in FIGS. 4 and 5. As the seal material approaches the point of maximum outwardly extrusion, the teeth cut through the seal material and dig or bite into the material of the keg or frictionally engage the keg material with an increase in unit pressure to resist rotation of the unit 10 relative to the keg. After the assembly is completed some of the material of the seal member is squeezed in the spaces between the teeth and other such material is located in a generally annular ring 48 surrounding the base portion 26. The seal material squeezed into the spaces between the teeth aids in resisting loosening by vibration, shock, etc. The annular ring 48 of the seal member material is integrally connected to the inner portion of the seal member by the ribs of material located between the teeth and completely covers the joint between the keg and the unit to prevent the entry of dirt or bacteria into any gap or crack which might otherwise be present. The configuration of the seal member after the assembly is completed is shown in FIG. 7.

In FIGS. 8 and 9, the invention is shown embodied in a device different from the keg unit 10 and comprising basically a nut and bolt type of fastener of otherwise generally conventional construction. The device is shown to include a part or nut 10a which carries a seal member indicated at 12a. The nut 10a has a generally hexagonal body and includes a recess 38a for receiving the seal member 12a. A generally flat surface 40a spaced rearwardly from the forward end of the annular wall 34a forms the bottom of the recess 38a. If desired, the inner radial surface of the recess may be formed by the nut, however, in the present instance this surface is provided by the outer surface 42a of the shank of the associated bolt 52.

The nut 10a is restrained against rotational movement relative to the member to be sealed by a series of forwardly projecting circumaxially spaced teeth 44a, 44a which are formed in the free edge of the annular wall 34a. The teeth 44a, 44a may vary in shape, but like the teeth of the aforedescribed embodiment are shown to be generally V-shaped. Each tooth includes a forwardly facing and radially extending incising edge 46a for cutting, digging into, or frictionally engaging the member to be sealed when the nut is assembled with the member.

Like the seal member of the aforedescribed embodiment, the seal member 12a is made from an elastomeric or deformable material and closely conforms to the shape of the recess which receives it. It should also be noted that in its undeformed condition prior to assembly the seal member 12a is preferably located entirely within the axial projection of the radially inwardly facing surface 36a as best shown in FIG. 9. It should also be noted that the volume of the seal member 12a is somewhat greater than the volume of the recess 38a and that prior to assembly a portion of the seal member projects forwardly from the recess.

When the part 10a is moved toward an associated bearing surface on the member to be sealed a portion of the seal material is extruded generally radially outwardly in the manner previously described. It will be evident that when the bolt 52 is employed to provide the means for defining the outwardly facing wall of the recess 38a it is probable that at least a portion of such surface will be defined by the threaded portion of the bolt. In this instance, some of the elastomeric seal material will be extruded inwardly or toward the bolt to fill the thread groove when the device is brought into sealing engagement with a member. However, it will be apparent that the condition resulting from this inwardly extrusion of seal material may be compensated for by an increase in the volume of the seal member so that a sufficient quantity of material will be available for outward extrusion to form an annular ring surrounding the wall 34a when the device is assembled with a member to be sealed. It should also be noted that in accordance with the broader aspects of this invention it is not always necessary to provide for extrusion of the seal member beyond the confines of its recess and that, if desired, the seal may be designed so that the annular wall 34a or its equivalent will directly engage the member to be sealed without any seal material being located between it and the member.

Although the seal of this invention in the embodiment of FIGS. 8 and 9 is shown and described as being included in this nut member of a threaded fastener it will be apparent that the seal in such a fastener could be included in the head of its bolt member or in a separate washer-type member, and such embodiments are intended to be within the scope of this invention.

In FIG. 10 the invention is shown embodied in a part 10b which may, for example, be a keg unit generally similar to the keg unit 10 or a fastener generally similar to the nut 10a. Like the aforedescribed embodiments the part 10b has a body which includes an annular wall 34b. A circumaxially spaced series of forwardly projecting teeth 44b, 44b are provided on the wall 34b and each tooth includes a generally forwardly facing radially extending incising edge 46b. The part 10b also includes an annular recess 38b the bottom of which is formed by a generally flat surface 40b spaced rearwardly from the forward end of the annular wall 34b. The outer wall of the recess 38b is partially defined by a generally radially inwardly facing surface 36b of the wall 34b. It will also be noted that each of the teeth 44b includes a generally radially inwardly facing surface 37b which is inclined outwardly from the surface 36b and which serves to further define the recess 38b.

Like the seal member of the aforedescribed embodiments, the seal member associated with the part 10b is made from an elastomeric material and has a volume substantially greater than the volume of the recess in which it is received so that a portion of the seal material is extruded radially outwardly beyond the outer boundary of the teeth 44b, 44b when the part 10b is moved toward an associated bearing surface on a member to be sealed.

The inclined surfaces 37b, 37b aid in the radially outward extrusive flow of elastomeric seal material and thereby materially reduce the force or tightening torque required to bring the part 10b into an assembled condition with a member to be sealed.

The invention claimed is:

1. In a device for use with a member having an opening and a bearing surface surrounding and generally normal to the axis of the opening, the combination comprising a part having a shoulder portion adapted to reside adjacent said bearing surface and including an annular recess, means for moving said part toward said bearing surface, and an elastomeric seal member in said recess, said shoulder portion including a series of generally circumaxially spaced teeth adjacent the radially outer boundary of said recess, each of said teeth including a sharp edge for engaging said bearing surface as said shoulder portion is moved toward said bearing surface, and said seal member having a volume sufficiently greater than said recess so that as said part is moved toward said bearing surface a portion of said seal member is extruded radially outwardly beyond the outer boundary of said teeth before said teeth reach said bearing surface, said sharp edge as a result of further movement of said part toward said bearing surface thereafter serving to cut through the seal material located by extrusion between said bearing surface and said sharp edge, said seal member after extrusion having an annular inner portion filling said recess, an annular outer portion surrounding said outer boundary of said teeth in engagement with said bearing surface, and ribs located between said teeth engaging said bearing surface and integrally connecting said inner and outer portions.

2. The combination defined in claim 1 further characterized by means providing a generally radially outwardly facing surface surrounding said axis and spaced radially inwardly from said shoulder portion, said means at least partially defining said recess.

3. The combination defined in claim 2 wherein said means providing a generally radially outwardly facing surface comprises an axially forwardly extending shank integrally formed upon said part.

4. The combination defined in claim 1 wherein said first-mentioned member includes a forwardly facing seating surface surrounding said opening and generally normal to the axis of said opening and said part includes a generally axially extending stem adapted to extend through said opening and including a threaded end portion projecting forwardly beyond said seating surface, and a nut threadably received upon said threaded end portion and adapted to bear upon said seating surface, said threaded end portion and said nut comprising said means for moving said part.

5. The combination defined in claim 1 wherein each of the said teeth is generally V-shaped and wherein the sharp edge of each tooth is arranged generally radially of said axis.

6. The combination defined in claim 1 further characterized by said teeth being harder than the material defining said bearing surface, said sharp edge incising said bearing surface.

7. The combination defined in claim 1 wherein each of said teeth includes a generally radially inwardly facing surface inclined generally outwardly from said recess.

References Cited
UNITED STATES PATENTS

| | | | |
|---|---|---|---|
| 1,016,746 | 2/1912 | Herzog | 151—14.5 |
| 1,220,818 | 3/1917 | Boosey | 285—119 |
| 2,172,311 | 9/1939 | Thomas | 285—212 X |
| 2,342,425 | 2/1944 | Parker | 285—220 |
| 2,759,743 | 8/1956 | Bloom | 285—119 |
| 3,040,796 | 6/1962 | Gouverneur | 151—7 |
| 3,104,120 | 9/1963 | Myers | 285—161 |

FOREIGN PATENTS 662,298  12/1951  Great Britain.

CARL W. TOMLIN, Primary Examiner

D. W. AROLA, Assistant Examiner

U.S. Cl. X.R.

85—1; 151—7, 37; 277—166; 285—189, 328, 350

PO-1050
(5/69)

UNITED STATES PATENT OFFICE
CERTIFICATE OF CORRECTION

Patent No. 3,472,534          Dated October 14, 1969

Inventor(s) Frederick F. Stevens

It is certified that error appears in the above-identified patent and that said Letters Patent are hereby corrected as shown below:

Col. 1, line 57, "aforementioned U. S. patent and including" should read --aforedescribed character for maintaining--.

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents